United States Patent Office 3,558,716
Patented Jan. 26, 1971

3,558,716
METHOD OF PRODUCING BETA-BRANCHED
ALDEHYDES
Friedrich Engelhardt and Wolfgang Schritt, Hamburg, Germany, assignors to Deutsche Erdol-Aktiengesellschaft, Hamburg, Germany
No Drawing. Filed Jan. 24, 1966, Ser. No. 522,384
Claims priority, application Germany, Dec. 14, 1965, D 46,359
Int. Cl. C07c 45/20
U.S. Cl. 260—601  12 Claims

ABSTRACT OF THE DISCLOSURE

Beta-branched aldehydes are produced by dimerization of at least one primary alcohol having a $CH_2$ group in beta position, by forming a reaction mixture consisting essentially of at least one primary alcohol having a $CH_2$ group in beta position to the hydroxyl group and of a dehydrogenation catalyst consisting essentially of at least one metal oxide selected from the group consisting of oxides of copper, zinc, lead, chromium, molybdenum, tungsten and manganese, and basically activated with a substance selected from the group consisting of zinc oxide, cadmium oxide and the oxides and hydroxides of the alkali and alkaline earth metals, the catalyst being present in an amount of at least about 5 grams per mol of the alcohol and sufficient to cause at elevated temperature conversion of said alcohol into the aldehyde, and heating the reaction mixture at a temperature and for a period of time sufficient to cause conversion of the alcohol into the aldehyde, and evaporation of at least about 80% of the amount of water formed upon complete conversion of the at least one alcohol into the beta-branched aldehyde, the latter having a number of carbon atoms corresponding to the combined number of carbon atoms of the two alcohol molecules which are thus subject to dimerization.

The present invention relates to a method of producing beta-branched aldehydes.

It is an object of the present invention to provide a method for producing beta-branched aldehydes, which may be saturated or unsaturated aldehydes, in a simple and economical manner and in good yield.

Other objects and advantages of the present invention will become apparent upon further reading of the description and of the appended claims.

With the above and other objects in view, the present invention comprises a method of producing beta-branched aldehydes, comprising the steps of forming a reaction mixture consisting essentially of at least one primary alcohol having a $CH_2$ group in beta position to the hydroxyl group, alkali and a dehydrogenation catalyst consisting essentially of at least one metal oxide, the catalyst being present in an amount sufficient to cause at elevated temperature conversion of the alcohol into the aldehyde, and heating the reaction mixture at a temperature and for a period of time sufficient to cause conversion of the alcohol into the aldehyde and evaporation of at least about 80% of the amount of water formed upon complete conversion of the alcohol into the aldehyde.

According to the Guerbet reaction, beta-branched primary alcohols are obtained by reacting primary alcohols which in beta position to the hydroxyl group have a methylene ($CH_2$) group, in the presence of alkali and at elevated temperature in accordance with the following equation:

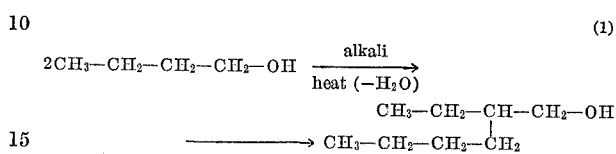

The thus obtained beta-branched alcohol has a number of carbon atoms which is equal to twice the number of carbon atoms of the alcohol serving as starting material. Secondary alcohols having a methylene group in beta position can be reacted in the same manner.

It is assumed that the initial alcohol is first subjected to dehydrogenation which will convert the alcohol into the corresponding non-branched aldehyde. Under formation of water, the non-branched aldehyde is then condensed into a unsaturated branched aldehyde with twice the number of carbon atoms as the initial alcohol. In the final stage, the thus formed unsaturated branched aldehyde is then hydrogenated to form a saturated beta-branched primary alcohol in accordance with the following equations:

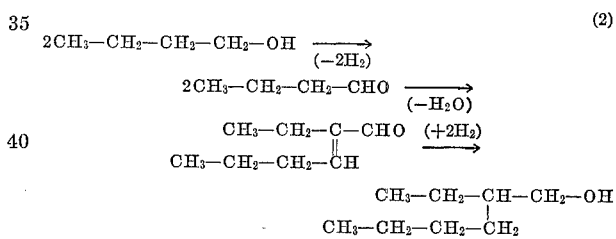

The yield of beta-branched primary alcohol is considerably increased by supporting the dehydrogenation reaction with the help of dehydrogenation catalysts and by continuously removing by distillation the condensation water formed during the reaction.

In addition to the branched alcohol also small amounts of a trimeric alcohol, carboxylic acids and some aldehyde are formed.

According to the present invention, a method is provided which permits the production of beta-branched saturated and unsaturated aldehydes by utilizing the general reaction mechanism of the Guerbet reaction whereby however, surprisingly, considerably higher yields are obtained.

It is thus proposed according to the present invention to modify the Guerbet reaction in such a manner that as the main product at first beta-branched saturated aldehydes are produced in accordance with the following equation:

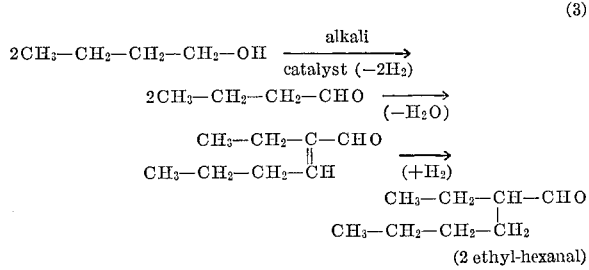

(2 ethyl-hexanal)

This is accomplished by utilizing catalysts which as to their type and proportion in the reaction mixture are specifically suitable for catalyzing the reaction according to Equation 3.

Generally, it has been found that the catalysts which can be used for producing aldehydes as described above may also be used for the synthesis of branched alcohols. However, many catalysts which are suitable for obtaining branched alcohols are not suitable for the formation of aldehydes in accordance with Equation 3.

All primary alcohols which in beta position to the hydroxyl group possess a methylene group may be used as the starting material for producing beta-branched aldehydes. It follows that these alcohols must have at least three carbon atoms.

Not only straight-chain, but also branched alcohols may be used as the starting material, provided that they possess a methylene group in beta position to the hydroxyl group.

The maximum number of carbon atoms in the alcohols which may be used as a starting material for the method of the present invention theoretically is unlimited. For practical purposes, the maximum number of carbon atoms in the starting alcohol may be about 50. Even in the case of such alcohols with relatively high molecular weights, for instance alcohols containing between 20 and 50 carbon atoms, the method can be carried out in the same manner as described further above, with the only exception that the proportion of the water formed during the reaction, which is to be distilled off, is preferably somewhat reduced with increased molecular weights of the starting alcohols.

Catalysts which are suitable for producing beta-branched aldehydes as well as alcohols and which thus may be used in accordance with the present invention are, for instance, copper oxide, and chromium oxide-containing catalysts. Catalysts which only catalyze the formation of branched alcohols but not the formation of a branched aldehydes are metals such as palladium, nickel, platinum and the like.

It is essential that the catalysts which are used for the method of the present invention are dehydrogenation catalysts and consist essentially of a metal oxide or a mixture of metal oxides. Preferably the catalysts which are utilized according to the present invention will consist essentially of an oxide of at least one metal selected from the group consisting of copper, zinc, lead, chromium, molybdenum, tungsten, manganese, and mixtures thereof. The valence of the metal in the metal oxide must be such that the respective metal oxide falls within the definition of dehydrogenation catalysts. It is well known to those skilled in the art that the oxides of such metals are effective as dehydrogenation catalysts only if the respective metals of the oxides are present in certain valence states, and that the same metals when of different valence are not effective as dehydrogenation catalysts, and consequently also not useful for the method of the present invention.

Particularly suitable are the basically activated oxidic dehydrogenation catalysts. Basic activation is achieved by the addition of oxides and/or hydroxides of the alkali and alkaline earth metals or of zinc oxide or cadmium oxide. In addition, the catalysts may also include conventional carrier substances such as activated carbon, kieselguhr, aluminum oxide and the like.

It is essential that the amount of catalyst in grams which is present for each mol of starting alcohol, is considerably greater than the amount of such catalyst required for forming a dimeric alcohol.

The amount of catalyst present relative to the molar quantity of the alcohol serving as starting material will determine whether during the synthesis branched alcohols or aldehydes are formed. Aldehyde may be formed, for instance, by using between about 8 and 12 times the amount of catalyst which would be required for forming the branched or dimeric alcohol. According to a preferred embodiment of the present invention, oxidic copper and chromium catalysts are utilized for the synthesis of the branched aldehydes in an amount equal to about ten times the amount of these catalysts which would be required for the synthesis of the branched alcohols.

Generally, according to the present invention between 5 and 12 grams of catalyst are used for each mol of the starting alcohol when a saturated aldehyde is to be produced and between 20 and 30 grams when an unsaturated aldehyde is to be produced. Generally, an excess of catalyst is not harmful. Preferably, for producing a saturated aldehyde, the amount of catalyst will be between about 8 and 12 grams per mol of starting alcohol.

The reaction is completed when a major portion of the water formed during the reaction has been evaporated. Thus, the completion of the reaction can be easily determined by condensing the evaporated water and measuring the amount thereof. For instance, the reaction mixture may be boiled under evaporation of water until, upon cooling of the thus formed water vapor, the desired amount of condensation water, generally between about 80 and 98% of the amount of water which theoretically would be formed upon completion of the reaction, has been obtained. The length of time for which the reaction mixture has to be kept boiling will depend on the specific starting alcohols, and the heating may be carried out for a period of up to several hours.

In a most convenient manner, the amount of water which is produced by the dimerization reaction may be measured in a water separator. Such apparatus suitable for carrying out the method of the present invention comprises a glass tube extending vertically and having a closed lower end and being located underneath the reflux cooler of the reaction vessel. The liquid flowing back through the reflux cooler drops first into the water separator. Therein a phase separation takes place, the upper, organic phase flows continuously back into the reaction vessel while the lower, i.e., water, phase collects in the water separator. The side wall of the water separator is provided with a scale marked in cubic centimeters so that it is possible, without difficulty, to check the amount of separated water. An apparatus of this type is, for instance, illustrated in the well-known textbook by Gatermann-Wieland, "Die Praxis des Organischen Chemikers," Berlin, 1954, page 170.

The reaction mixture is now heated until between about 80 and 98% of the amount of water which theoretically should be formed in accordance with Equation 3, i.e., one mol water for each two mols of the starting alcohol, has collected in the water separator.

The temperature is automatically adjusted by the requirement to heat until between 80 and 98% of the theoretically formed water has separated, and will depend on the type and particularly the molecular weight and number of carbon atoms of the starting alcohol. Alcohols with short carbon chains will be heated to a temperature of about 160° C., alcohols with longer carbon chains will be heated to correspondingly higher temperatures, whereby the upper temperature limit will be in the neighborhood of between 270° and 280° C.

Thus, the reaction is primarily controlled by checking the amount of water which has been separated, and, only more or less as a control, the temperature may be checked, which desired temperature will be determined for any given starting alcohol in accordance with the considerations discussed herein.

Prolonged heating and excessively high temperatures may be harmful to the reaction product. The longer and the higher the heating must be carried out in order to separate between 80 and 98% of the theoretically produced amount of water, the greater will be the amount and the variety of simultaneously formed side products. Length of time and temperature of heating of the reaction mixture are directly proportionate to the molecular weight of the starting alcohols. It is therefore advantageous, and generally suggested when higher alcohols containing more than 20 carbon atoms are used as starting material, to terminate the reaction when about 80% of the dimerization water has been collected in the water separator, because at that point no larger amounts of side products will have been formed and because this obviates the necessity of further raising the temperature, which again would cause increased formation of side products.

Generally it is preferred to carry out the reaction until, in the case of lower alcohols of between 3 and 6 carbon atoms per molecule, between 95 and 98% of the theoretical amount of dimerization water has been collected, in the case of alcohols of medium molecular weight (between 7 and 20 carbon atoms per molecule) between 85 and 95%, and in the case of higher alcohols containing more than 20 carbon atoms per molecule between 80 and 85%.

It is also possible by following the teachings of the present invention to produce unsaturated beta-branched aldehydes in accordance with the following equation:

(4)

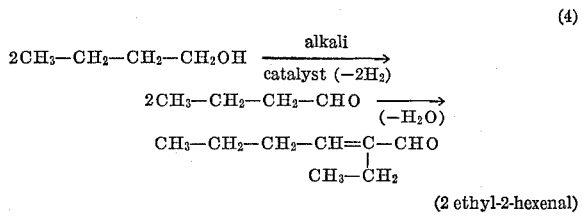

(2 ethyl-2-hexenal)

In order to obtain the unsaturated, beta-branched aldehydes, it is necessary, under otherwise equal conditions, to increase the amount of dehydrogenation catalyst to between about 2 and 3 times the amount thereof which would be required for producing the saturated aldehyde, which corresponds to about between 20 and 30 times the amount of the catalyst which would be required to produce the corresponding branched alcohol.

The yield of unsaturated beta-branched aldehydes can be improved by including in the reaction mixture hydrogen acceptors such as manganese dioxide, nitrobenzene and the like.

It may be assumed (without however limiting the invention to any specific theoretical explanation) that the effect of the hydrogen acceptors is as follows:

The surface of the dehydrogenation catalyst is charged during the course of reaction with hydrogen. Thereby a certain degree of inactivation of the catalyst takes place. However, if the produced hydrogen is caught by the hydrogen acceptors and thus will not cover the surface of the hydrogenation catalyst, then such active surface will remain free and this will increase the catalystic effect.

Generally, all known hydrogen acceptors which do not react with the reactants and reaction products of the present process (with the exception of accepting hydrogen) may be used. In addition to manganese dioxide and nitrobenzene, hydrogen acceptors selected from the following compounds and groups gave good results: organic nitro compounds, $PbO_2$, HgO, Redox resins, sulfur, selenium, $CH_3SOCH_3$, methylene blue and olefins.

Preferably, the hydrogen acceptors are incorporated in the reaction mixture in an amount equal to between 2 and 10 grams for each mol of the alcohol used as starting material. Introduction of the hydrogen acceptors will generally increase the yield of unsaturated aldehydes by about 5%.

The following examples are given as illustrative only without, however, limiting the invention to the specific details of the examples.

EXAMPLE I

Production of 2-hexyldecanal 260 grams of 1-octanol, 6.5 grams KOH and 20 grams of a dehydrogenation catalyst, in the present example a mixture of equal molar proportions of CuO and $Cr_2O_3$ activated with 0.5 gram BaO, are slowly heated under reflux during a period of about 4 hours to a temperature of 260° C. As soon as 17 ml. water, equal to 94% of the theoretically produced amount of water has collected in the water separator, the reaction mixture is allowed to cool to 100° C. and then the catalyst is separated by filtration. The thus obtained liquid is neutralized with 10% hydrochloric acid and the end product is recovered by distillation. 2-hexyldecanal having a boiling point of 109° C./0.1 mm. is obtained in a yield of 81%.

If the amount of the dehydrogenation catalyst is reduced to 2 grams, then, upon heating, 2-hexyldecanol will be obtained in a yield of nearly 90%.

EXAMPLE II

Production of 2-octyldodecanal

A reaction mixture consisting of 317 grams 1-decanol, 6.5 grams KOH and 20 grams of a dehydrogenation catalyst consisting of one part CuO and two parts $Cr_2O_3$ to which for basic activation 0.2 gram ZnO were added, is brought to boiling. After continuing boiling for about 1½ hours, the temperature of the mixture will reach 270° C. This temperature is maintained for about 30 minutes and thereafter the mixture is permitted to cool to 100° C. 16.5 ml. of water equal to 92% of the theoretically formed amount will have collected in the water separator. The catalyst is then separated by filtration and the residual liquid neutralized with 10% hydrochloric acid. Upon subsequent distillation, 2-octyldodecanal having at a pressure of 0.1 mm. Hg a boiling point of between 139° and 141° C. is thus recovered in a yield of 71%.

If the amount of the dehydrogenation catalyst is reduced to about 2.5 grams, the reaction will produce in a very good yield 2-octyldodecanol-1.

EXAMPLE III

Production of 2-decyltetradecanal 373 grams 1-dodecanol, 6.5 grams KOH and 20 grams of a dehydrogenation catalyst consisting of one part of CuO and three parts $Cr_2O_3$ to which as basic activator 0.4 gram CdO have been added are heated during about one hour to a temperature of 280° C. and maintained at this temperature for a further hour. 16 ml. of water, or 89% of the theoretically obtainable amount of water are formed and continuously withdrawn from the reaction mixture. Thereafter the reaction mixture is allowed to cool to about 100° C., filtered and distilled. In this manner, 2-decyltetradecanal having a boiling point of between 182° and 185° C./0.1 mm. Hg are obtained in a yield of 75%.

By proceeding as described above but introducing only 0.2 gram of the dehydrogenation catalyst into the reaction mixture, the alcohol 2-decyltetradecanol-1 is obtained instead of the aldehyde.

EXAMPLE IV

Production of 2-hexyl-2-decenal

A mixture of 260 grams 1-octanol, 6.5 grams KOH and 50 grams of a dehydrogenation catalyst composed of equal proportions of CuO and $Cr_2O_3$ and basically activated with 0.5 gram BaO is heated to boiling until the temperature reaches 260° C. Heating is then continued at 260° C. for a further half hour. 17 ml. water equal to 94% of the theoretical amount are formed and separated. The reaction mixture is then allowed to cool to 100° C., the catalyst is removed by filtration and the residual liquid neutralized. The final product, namely 2-hexyl-2-decenal of the formula:

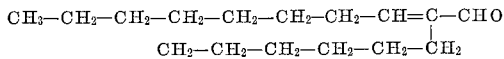

having a boiling point of 107°–108° C./0.1 mm. is obtained thereby in a yield of about 70%.

EXAMPLE V

The process of Example IV is repeated with the only change that ten grams nitrobenzene are added to the initial reaction mixture. Thereby an improvement in the yield of 2-hexyl-2-decanal equal to about 5% is achieved.

EXAMPLE VI

The process of Example IV is repeated with the sole exception that 4 grams $MnO_2$ are added to the initial reaction mixture. Thereby an improvement in the yield of 2-hexyl-2-decanal equal to about 7% is achieved.

EXAMPLE VII

It is also possible according to the present invention to carry out codimerizations, i.e., dimerizations of two or more different alcohols, as shown in the present example:

130 grams 1-octanol, 158 grams 1-decanol, 6.5 grams KOH and 20 grams of a dehydrogenation catalyst formed of equal molar proportions of CuO and $Cr_2O_3$ with 0.5 gram BaO added are heated over a period of 2½ hours under reflux to a temperature of 270° C. whereby the condensed water is continuously separated in the water separator described further above until, after 2½ hours of heating, 17 ml. of water have been separated. Thereafter, the reaction mixture is allowed to cool to 100° C., the catalyst is removed by filtration and the residual liquid is neutralized with 10% hydrochloric acid. The thus formed aldehyde mixture is separated by distillation at boiling points between 108° and 140° C./0.1 mm. Hg. The total yield is found to be about 75%, and the following aldehydes are found to have been formed:

2-hexyldecanal (of octanol+octanol),
2-hexyldodecanal (of octanol+decanol),
2-octyldecanal (of octanol+decanol),
2-octyldodecanal (of decanol+decanol).

By initially introducing into reaction mixture three different alcohols, eight different beta-branched aldehydes are obtained.

Generally, for producing saturated and unsaturated beta-branched aldehydes according to the present invention between 0.02 and 0.1 mol of alkali for each mol of the starting alcohol is to be included in the reaction mixture. Preferably, the amount of alkali is 0.05 mol per mol of starting alcohol.

Other alkalis which can be used instead of potassium hydroxide are sodium hydroxide, lithium hydroxide, calcium oxide, and barium hydroxide.

Saturated beta-branched aldehydes are useful starting materials for the preparation of ester lubricants. Unsaturated beta-branched aldehydes find utility in the preparation of synthetic resins.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing beta-branched saturated aldehydes, comprising the steps of heating under reflux a mixture of at least one primary hydrocarbon alcohol having a $CH_2$ group in beta position to the hydroxyl group and having at least three carbon atoms and a catalyst selected from the group consisting of copper oxide, chromium oxide and a mixture of these two oxides, the said catalyst being basically activated with a compound selected from the group consisting of zinc oxide, calcium oxide, and oxides and hydroxides of an alkali or alkaline earth metal, said catalyst being present in an amount between about 5 and 12 g. per mol of said hydrocarbon alcohol and said heating being effected at a temperature and for a period of time sufficient to cause evaporation of between about 80 and 98% of the theoretical amount of water of reaction, the number of carbon atoms in said aldehyde being twice the number of carbon atoms in said hydrocarbon alcohol.

2. The process of claim 1, wherein said catalyst is present in an amount between 8 and 12 g. per mole of alcohol.

3. A method of producing beta-branched aldehydes as defined in claim 1, wherein said alcohol has between 3 and 6 C atoms and said heating is continued until between 95 and 98% of the amount of water formed by complete conversion of said alcohol are evaporated.

4. A method of producing beta-branched aldehydes as defined in claim 1, wherein said alcohol has between 7 and 20 C atoms and said heating is continued until between 85 and 95% of the amount of water formed by complete conversion of said alcohol are evaporated.

5. A method of producing beta-branched aldehydes as defined in claim 1, wherein said alcohol has more than 20 C atoms and said heating is continued until between 80–85% of the amount of water formed by complete conversion of said alcohol are evaporated.

6. A method of producing beta-branched unsaturated aldehydes, comprising the steps of heating under reflux a mixture of at least one primary hydrocarbon alcohol having a $CH_2$ group in beta position to the hydroxyl group and having at least three carbon atoms and a catalyst selected from the group consisting of copper oxide, chromium oxide and a mixture of these two oxides, the said catalyst being basically activated with a compound selected from the group consisting of zinc oxide, calcium oxide, and oxides and hydroxides of an alkali or alkaline earth metal, said catalyst being present in an amount between about 20 and 30 g. per mol of said hydrocarbon alcohol and said heating being effected at a temperature and for a period of time sufficient to cause evaporation of between about 80 and 98% of the theoretical amount of water of reaction, the number of carbon atoms in said aldehyde being twice the number of carbon atoms in said hydrocarbon alcohol.

7. A method of producing beta-branched aldehydes as defined in claim 6, wherein said reaction mixture includes a hydrogen acceptor.

8. A method of producing beta-branched aldehydes as defined in claim 6, wherein said alcohol has between 3 and 6 C atoms and said heating is continued until between 95 and 98% of the amount of water formed by complete conversion of said alcohol are evaporated.

9. A method of producing beta-branched aldehydes as defined in claim 6, wherein said alcohol has between 7 and 20 C atoms and said heating is continued until between 85 and 95% of the amount of water formed by complete conversion of said alcohol are evaporated.

10. A method of producing beta-branched aldehydes as defined in claim 6, wherein said reaction mixture includes a hydrogen acceptor.

11. A method of producing beta-branched aldehydes as defined in claim 10, wherein said hydrogen acceptor is selected from the group consisting of nitrobenzene and MmO$_2$.

12. A method of producing beta-branched aldehydes as defined in claim 10, wherein said hydrogen acceptor is present in an amount of between about 2–10 grams per mol of alcohol.

References Cited
UNITED STATES PATENTS

| | | | |
|---|---|---|---|
| 3,328,470 | 6/1967 | Poe | 260—642 |
| 2,861,106 | 11/1958 | Opitz et al. | 260—603X |

OTHER REFERENCES

Dunbar et al., Journal of Organic Chem., vol. 10, pages 501–504, 1945.

Morrison et al., Organic Chemistry, page 639, 1965.

BERNARD HELFIN, Primary Examiner

R. LILES, Assistant Examiner

U.S. Cl. X.R.

260—531, 603, 642